United States Patent
Shah et al.

(10) Patent No.: US 12,292,404 B1
(45) Date of Patent: May 6, 2025

(54) VOLTAMMETRIC SENSOR FOR OXYTOCIN DETECTION

(71) Applicant: United Arab Emirates University, Al Ain (AE)

(72) Inventors: Afzal Shah, Al Ain (AE); Iltaf Shah, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 18/627,681

(22) Filed: Apr. 5, 2024

(51) Int. Cl.
| | |
|---|---|
| *G01N 27/327* | (2006.01) |
| *G01N 27/30* | (2006.01) |
| *G01N 27/48* | (2006.01) |
| *G01N 33/15* | (2006.01) |

(52) U.S. Cl.
CPC ....... *G01N 27/3278* (2013.01); *G01N 27/301* (2013.01); *G01N 27/48* (2013.01)

(58) Field of Classification Search
CPC ........... G01N 27/3278; G01N 27/3275; G01N 27/3277; G01N 27/301; G01N 27/48; G01N 33/15
See application file for complete search history.

(56) References Cited

U.S. PATENT DOCUMENTS

| | | | |
|---|---|---|---|
| 4,312,734 A * | 1/1982 | Nichols | G01N 27/36 204/435 |
| 2024/0201122 A1* | 6/2024 | Speck | G01N 27/302 |

OTHER PUBLICATIONS

Hassan Arida, "Novel pH microsensor based on a thin film gold electrode modified with lead dioxide nanoparticles," Microchim Acta (2015) 182:149-156 (Year: 2015).*
Asai et al., "Continuous and selective measurement of oxytocin and vasopressin using boron-doped diamond electrodes," Scientific Reports | 6:32429 | DOI: 10.1038/srep32429 (Year: 2016).*
Corrêa de Melo et al., "Simultaneous Differential Pulse Voltammetric Determination of L-Dopa and Carbidopa in Pharmaceuticals Using a Carbon Paste Electrode Modified with Lead Dioxide Immobilized in a Polyester Resin," J. Braz. Chem. Soc., vol. 18, No. 4, 797-803, 2007 (Year: 2007).*
Dryden et al., "Integrated Digital Microfluidic Platform for Voltammetric Analysis," Anal. Chem. 2013, 85, 8809-8816 (Year: 2013).*

* cited by examiner

*Primary Examiner* — Alexander S Noguerola
(74) *Attorney, Agent, or Firm* — MH2 Technology Law Group, LLP

(57) ABSTRACT

The present disclosure discloses a voltammetric sensor for the detection of oxytocin. The voltammetric sensor comprises a gold electrode. The gold electrode comprises lead oxide (PbO) nanoparticles. The present disclosure also discloses a method of detecting oxytocin using a voltammetric sensor, the voltammetric sensor comprising a gold electrode, the gold electrode comprising lead oxide (PbO) nanoparticles. The method of detecting oxytocin comprises the steps of positioning a liquid droplet, comprising solvent and analyte, to be tested on a sensing area of the gold electrode; receiving a voltammetric response from the electrode; and analysing the voltammetric response to determine if oxytocin is present in the liquid droplet.

16 Claims, 4 Drawing Sheets

VOLTAMMETRIC SENSOR FOR OXYTOCIN DETECTION

FIELD

The present disclosure concerns voltammetric sensors. More particularly, but not exclusively, the present disclosure concerns voltammetric sensors for the detection of oxytocin.

BACKGROUND

Background description includes information that will be useful in understanding the present invention. It is not an admission that any of the information provided herein is prior art or relevant to the presently claimed invention, or that any publication specifically or implicitly referenced is prior art.

Oxytocin is a neuropeptide hormone of nine amino acids. It is secreted in mammals endogenously. It is also administered exogenously as it is a recommended drug of the World Health Organization (WHO). In females', oxytocin plays a lactation inducing role while it acts as an indicator of "nutrient status" in both males and females. Oxytocin is used not only as human medicine but also as a veterinary medicine. It has diverse roles spanning from inducing effect on parturition to neuroendocrine responses, stress reduction and metabolic functions. Oxytocin is often used for inducing labor in pregnant mammals, for example. It can also be prescribed for curing infections of uterus. Uterine contraction also aids in stopping bleeding after delivery. Moreover, it helps in the removal of debris and bacteria from the uterus.

Along with a curing role, oxytocin also exerts detrimental effects if used improperly. For instance, overdose leads to rupturing of the uterus during induction of labor. Consequences of adverse maternal and neonatal outcomes occur in regions where vulnerable populations are plagued by compromised quality checks, poor regulatory control of oxytocin medication, and without prescription over-the-counter purchases. Less trained healthcare workers in rural areas and their approach of using short term and low-cost labor-inducing medication often leads to adverse effects on mother and baby.

Therefore, an analytical device for sensing the oxytocin content in medication doses is required.

Oxytocin is highly important for its clinical use of promoting milk ejection in lactating women, who experience difficulty in breast feeding. It is equally important for inducing milk ejection in lactating animals. However, desire for rapidly getting more milk from animals urges dairy farmers to adopt illegal means of milk production; for instance, they inject overdoses of oxytocin to cattle during the lactating period. Such indiscriminate administration of oxytocin for speedily inducing milk let down is extensively reported. This malicious behaviour may fulfil the needs of some dairy farmers but at the cost of danger (reduced lifespan and lowered fertility of the cattle) to lactating animals and also to human beings as food containing oxytocin content has been reported to cause detrimental health issues, such as premature puberty, hormonal imbalance, and water retention. Overdosed oxytocin has also been reported to develop allergic reactions, leading to symptoms like itching, swelling, or difficulty in breathing.

Hence, for public safety and animal protection, quality control and adoption of measures are needed to avoid administering the wrong dosage of oxytocin.

To this end, an effective quality control check on oxytocin content demands a reliable sensing device.

Oxytocin is conventionally measured by radioimmunoassay, enzyme immunoassay, high performance liquid chromatography and liquid chromatography-mass spectrometry. These techniques are sensitive but not appealing owing to tediousness, slow processing/time-consuming and limited suitability for point-of-care testing. LC-MS is expensive, demanding specialized equipment and suffers from potential interference by molecules of similar molecular weights. Radioimmunoassay involves handling radioactive materials, while immunoassays are sensitive to interferents.

The conventional methods of sensing oxytocin are each deficient in one or more of the following: difficult to prepare, liable to interference, slow to respond, inability to work with complex samples, require pure samples, limited sensing ability, and not re-useable.

Therefore, a sensitive and selective analytical sensor is required for its minute-level detection.

The present disclosure seeks to mitigate the above-mentioned problems. Alternatively, or additionally, the present disclosure seeks to provide an improved sensor for the detection of oxytocin.

SUMMARY

The present disclosure provides, according to a first aspect, a voltammetric sensor for the detection of oxytocin. The voltammetric sensor comprises a gold electrode, the gold electrode comprising lead oxide (PbO) nanoparticles.

Voltammetric sensors can be calibrated such that the voltammetric responses received from the sensor are highly specific and selective based on the analyte being detected. Voltammetric sensors of the present disclosure are able to discriminate the voltammetric response of oxytocin even in the presence of interfering agents that are higher in concentration than oxytocin by many multiples. Voltammetric sensors of the present disclosure also enable the possibility of real-time results.

In contrast to conventional sensors, the voltammetric sensor of the present disclosure is easier to prepare, is faster to respond, requires only a single droplet of the sample to be tested, is capable of working in complex samples, and is highly appropriate for the validity of label claims and for clinical laboratory testing and sensing oxytocin in tablets, injections, drips, milk, water, blood, plasma and urine.

The sensor may be a nano sensor. A sensing area of the gold electrode may have an area of less than 10 square millimetres ($mm^2$). A sensing area of the gold electrode may have an area of less than 8 square millimetres ($mm^2$). A sensing area of the gold electrode may have an area of less than 6 square millimetres ($mm^2$). A sensing area of the gold electrode may have an area of less than 4 square millimetres ($mm^2$). A sensing area of the gold electrode may have an area of less than 2 square millimetres ($mm^2$).

Having a gold electrode modified with lead oxide nanoparticles enables the use of a more sensitive sensor that possesses high specificity requiring samples of only small concentration.

The PbO nanoparticles may be between 20-50 nm in size. The PbO nanoparticles may be between 25-40 nm in size. The PbO nanoparticles may be between 30-35 nm in size. The PbO nanoparticles may be substantially 33 nm in size. The size of the PbO nanoparticles may refer to the largest diameter of the PbO nano particles.

The sensor may comprise a reference electrode. The reference electrode may comprise silver (Ag). The reference electrode may comprise silver (Ag) and silver chloride (AgCl).

The sensor may comprise a counter electrode. The counter electrode may comprise platinum (Pt).

The sensor may comprise a reference electrode and a counter electrode.

The sensor may comprise a potentiostat, the potentiostat being electrically connected to the gold electrode, the reference electrode, and the counter electrode.

According to a second aspect of the present disclosure there is provide a method of detecting oxytocin using a voltammetric sensor. The voltammetric sensor comprises a gold electrode, the gold electrode comprising lead oxide (PbO) nanoparticles. The method of detecting oxytocin comprises the steps of positioning a liquid droplet, comprising solvent and analyte, to be tested on a sensing area of the gold electrode; receiving a voltammetric response from the electrode; and analysing the voltammetric response to determine if oxytocin is present in the liquid droplet.

The method may comprise applying a drop of lead oxide (PbO) nanoparticles solution to the gold electrode and drying the drop of lead oxide nanoparticles solution.

The result of drying the drop of PbO nanoparticles solution may lead to coverage of a sensing area of the gold electrode with PbO nanoparticles.

This may be referred to as the sensing area being modified with PbO nanoparticles.

The method may comprise the step of evaporating the solvent of the liquid droplet such that the analyte remains on the sensing area of the electrode as a dry residue.

The liquid droplet may be oxytocin solution. The analyte may be oxytocin. In embodiments, the user might know that the liquid droplet comprises oxytocin prior to positioning the liquid droplet on the sensing area. In embodiments, the analysing the voltammetric response determines if oxytocin is present and a determines a concentration of oxytocin in the liquid droplet. In embodiments, the analysed concentration of oxytocin in the liquid droplet is a concentration range of oxytocin in the liquid droplet.

The inventors surprisingly found that by evaporating the solvent from the liquid droplet and leaving behind a dry residue, the diffusion step in conventional electroanalytical methods is bypassed. The diffusion step in conventional methods is often the step that limits the rate at which the analysis can be conducted. By evaporating the solvent from the liquid drop, the speed at which analysis can be conducted is increased. Furthermore, time lag in the diffusion of solvated analyte molecules is substantially eliminated, which results in the production of a voltammetric response with sharper peaks, which is more desirable for quantitative analysis. By drying the liquid droplet, dried analyte molecules have much better accessibility to the electrode surface leading to more efficient electron transfer and a much sharper peak.

The method may comprise the step of applying a supporting droplet onto the dry residue, the supporting droplet comprising a supporting solvent and a supporting electrolyte.

The supporting solvent may be water.

The supporting electrolyte may be sodium chloride (NaCl).

The concentration of NaCl may be between 0.1 and 0.6 moles per litre (M). The concentration of NaCl may be between 0.2 and 0.4 M.

The inventors have surprisingly found that NaCl as a supporting electrolyte provides improved electrochemical oxidation of the oxytocin, providing a more defined and higher peak on the voltammetric response.

The inventors have found that a concentration of NaCl in aqueous solution between 0.2 and 0.4 M obtains the largest and most well-defined peaks on the voltammetric response.

The voltammetric sensor may be a nano sensor. The PbO nanoparticles may be between 20-50 nanometres (nm) in size. The PbO nanoparticles may be between 25-40 nm in size. The PbO nanoparticles may be between 30-35 nm in size. The PbO nanoparticles may be substantially 33 nm in size. The size of the PbO nanoparticles may refer to the largest diameter of the PbO nano particles.

Having PbO nanoparticles on the nanoscale may be what defines the voltammetric sensor as a nano sensor.

The liquid droplet may be less than 10 microlitres in volume.

The sensor and method of the present disclosure enables the use of samples that are much smaller than conventional means.

The supporting droplet may be less than 20 microlitres in volume.

The method may comprise the step of treating the gold electrode with lead sulphate ($PbSO_4$) solution to regenerate the gold electrode after analysing.

The method may comprise the step of cleaning the gold electrode after the step of treating. The cleaning may comprise polishing the gold electrode with a polishing pad.

The method may comprise modifying the gold electrode with PbO nanoparticles. The modifying may comprise the step of applying a drop of lead oxide (PbO) nanoparticles solution to the gold electrode and drying the drop of lead oxide nanoparticles solution, to form a gold electrode comprising PbO nanoparticles. The modifying the gold electrode may be modifying the cleaned gold electrode.

Advantageously, after usage for oxytocin detection, the sensor does not be disposed of. The sensor of embodiments can be cleaned and prepared again for further detection assays. The cleaning of the used sensor requires the removal of the oxidised product of oxytocin, as well as PbO nanoparticles from the surface of the gold electrode. This may be done by putting the used sensor in lead sulphate ($PbSO_4$) solution that regenerates the gold electrode which may then need to be modified with PbO nanoparticles again prior to performing another detection.

It will of course be appreciated that features disclosed in relation to one aspect may be used in combination with another aspect, and vice versa.

BRIEF DESCRIPTION OF THE DRAWINGS

The manner in which the above-recited features of the present disclosure is understood in detail, a more particular description of the present disclosure, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of voltammetric sensors, and more particularly to voltammetric sensors for the detection of oxytocin.

The principles of the present invention and their advantages are best understood by referring to the embodiments disclosed in FIGS. 1 to 4. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment." "an embodiment." "embodiments." or "one or more embodiments" are intended to indicate that a particular feature, structure, or characteristic described in connection with the embodiment is included in at least one embodiment of the present disclosure.

Figure 1:
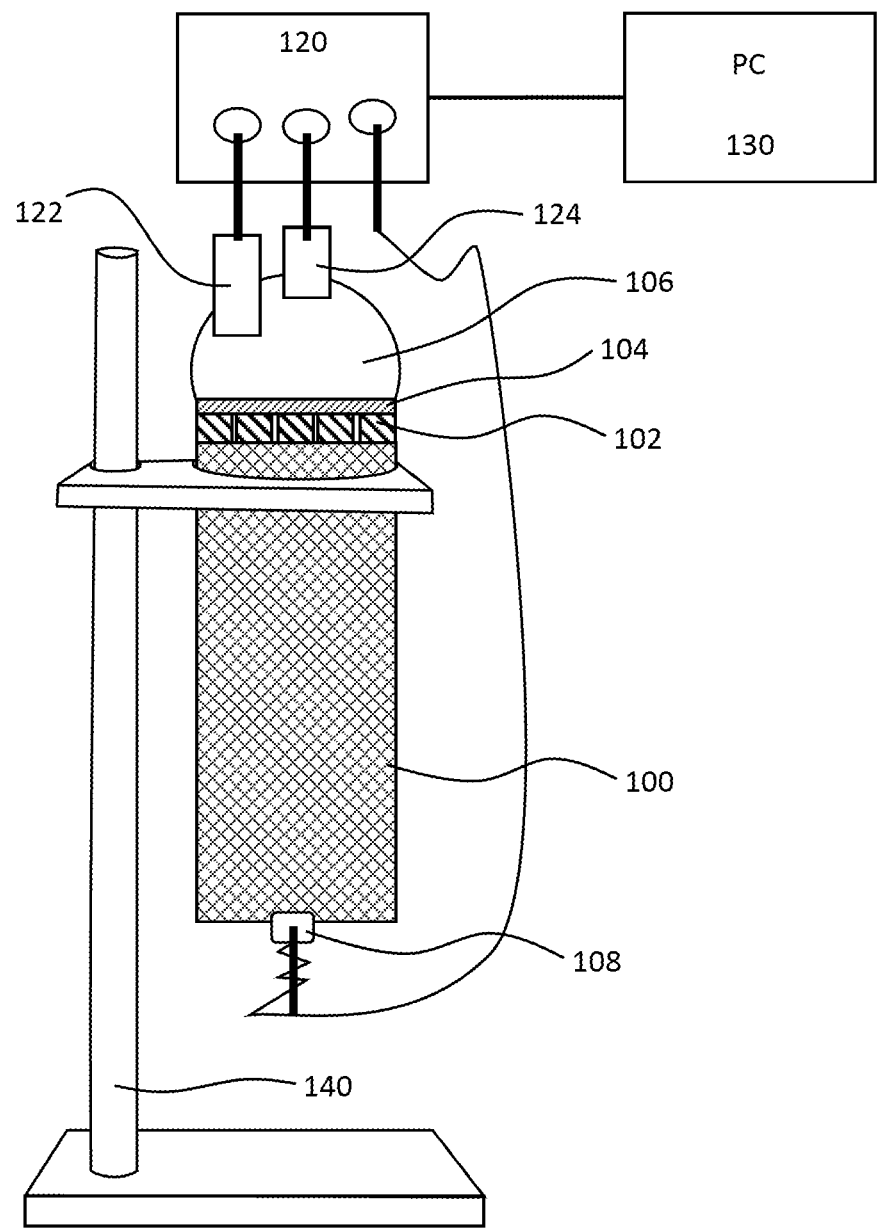
FIG. 1 shows a voltammetric sensor for oxytocin according to an embodiment of the present disclosure.
Figure 2:
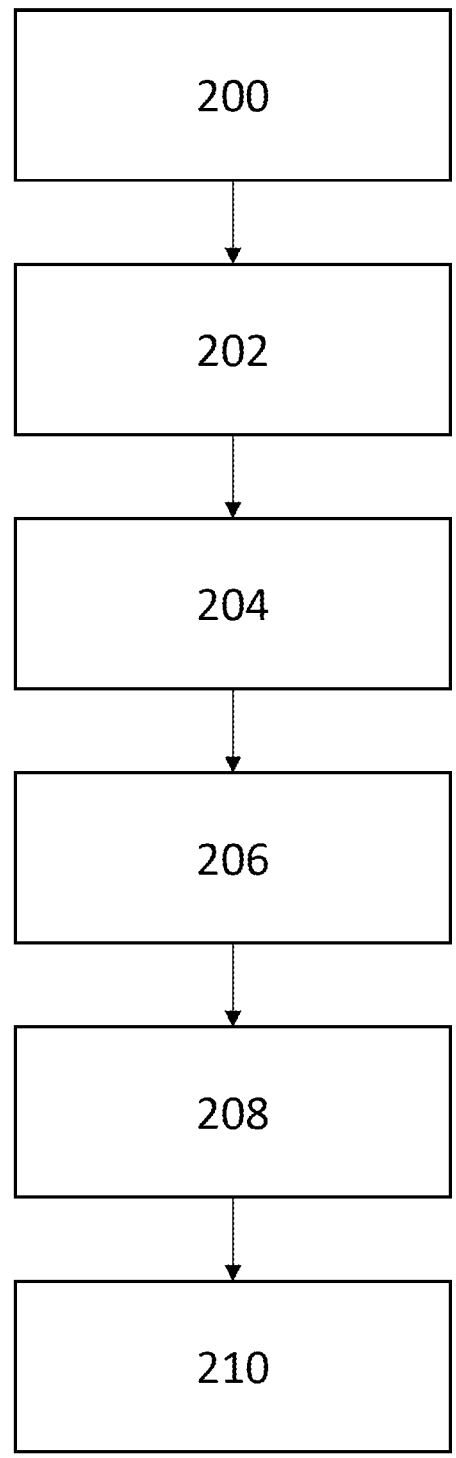
FIG. 2 shows a method of preparing lead oxide (PbO) nanoparticles according to an embodiment of the present disclosure.
Figure 3:
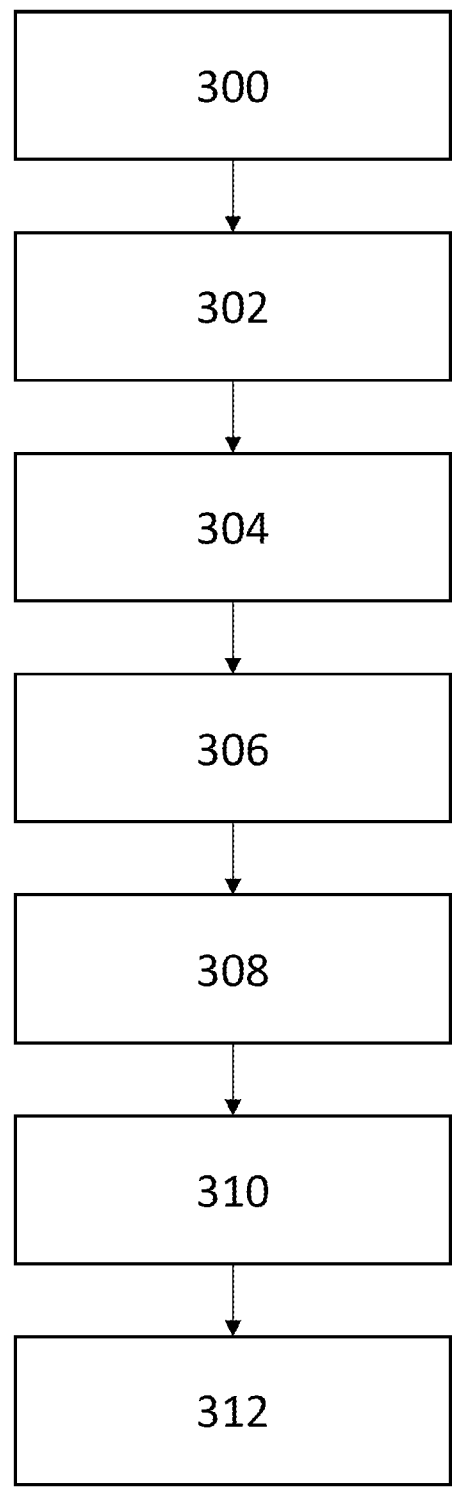
FIG. 3 shows a method of detecting oxytocin according to an embodiment of the present disclosure.

FIG. 1 shows a voltammetric sensor for oxytocin according to an embodiment of the present disclosure.

The sensor comprises a gold electrode 100 that is held vertically in place by the wooden stand 140. The suspended sensor clipped through a wooden hook of the stand 140 allows voltammetric measurement without any contact issue with a conducting surface. Unlike conventional cells in which electrodes are suspended and the electrode modifier usually leaches away from the sensor surface due to gravity and dissolution in solvent medium.

The gold electrode 100 is modified with lead oxide (PbO) nanoparticles 102 on an upper sensing area. More detail on how the PbO nanoparticles are deposited on the gold electrode is provided later in the detailed description. Coating the PbO modified gold electrode is a layer of oxytocin 104. The layer of oxytocin 104 has been formed by positioning a small droplet of solvent and dissolved oxytocin onto the electrode, after which the solvent is evaporated off leaving a layer of oxytocin 104.

This approach results in the enhancement of the electrochemical signal as molecules of the oxytocin are already present on the electrode surface in a dried form, and their diffusion from the solution is not required. Hence, the diffusion step is circumvented, this diffusion step being a reason for the slower response of conventional electrochemical methods. Current electrochemical methods produce voltammetric responses of analytes with broader peaks due to time lag in the diffusion of solvated analyte molecules from solution and their poor accessibility to the electrode surface, while the method of embodiments of the present disclosure generates an intense signal of the target analyte at least partially due to skipping of the diffusional step through the solution and much closer access to the electrode surface leading to efficient electron transfer and consequent sharp peak as desired for quantitative analysis. Moreover, conventional methods utilize large quantities of samples for investigation in the electrochemical cell. The method of embodiments of the present disclosure demands only a droplet of the sample for analysis and utilizes an electrochemical cell just for solvent in which a modified electrode with the dried sample from the droplet is dipped. Hence, methods according to embodiments are economical, faster, and suitable for quantitative analysis along with the additional benefit of being environmentally friendly.

On top of the oxytocin layer 104 is a supporting droplet 106 comprising supporting solvent and supporting electrolyte. The supporting solvent is water, and the supporting electrolyte is sodium chloride (NaCl). The sodium chloride is in a concentration of 0.3 mol per litre (M).

An end 108 of the gold electrode 100 is connected to a potentiostat 120. Also connected to the potentiostat 120 is a silver or silver chloride (Ag/AgCl) reference electrode 122 and a counter electrode 124 formed of a platinum wire.

The potentiostat 120 is connected to a computer 130. The output of the system are voltammetric charts that are interpreted to determine the presence of oxytocin within the sample being tested.

FIG. 2 shows a method of preparing lead oxide (PbO) nanoparticles according to an embodiment of the present disclosure.

First, in step 200, sodium hydroxide (NaOH) is added slowly and dropwise to 0.1 M lead nitrate ($Pb(NO_3)_2$). The mixture is stirred 202 for an hour until the appearance of a white precipitate. The resulting precipitate is filtered and centrifuged 204 to remove any impurities.

The precipitate is then allowed to dry 206 by being kept in an oven at 70° C.

Finally, the lead oxide nanoparticles are calcined 208 at 500° C., and then stored 210 until further use.

FIG. 3 shows a method of detecting oxytocin according to an embodiment of the present disclosure.

In the first step 300, PbO nanoparticles as produced in FIG. 2 are made into a solution and a 5 ml drop is applied to a sensing area of the gold electrode.

The PbO nanoparticle drop is then dried 302 to leave a coverage of PbO nanoparticles on the sensing area of the gold electrode.

A 5 ml drop of analyte solution is then added 304 onto the sensing area. The analyte drop is dried 306 to leave dry analyte on the surface of the sensing area of the electrode.

A 10 ml drop of a supporting droplet comprising a supporting solvent and supporting electrolyte is added 308 on top of the dry analyte. The supporting solvent is water, and the supporting electrolyte is sodium chloride.

In embodiments of the present disclosure, the supporting electrolyte is potassium chloride, or sulphuric acid, for example.

The reason for the use of a larger droplet in step 308 is that the droplet size is needed to be maintained before its evaporation, so that the voltammetric measurement of oxytocin can take place.

The voltammetric response is then measured and analysed 310 to determine the presence and concentration of oxytocin in the sample. In embodiments of the present disclosure, there is a pre-calibration of the measurement with known concentrations of oxytocin, so that a voltammetric response of a sample with unknown concentration can be correlated to a specific concentration of oxytocin in that sample.

The electrode is then regenerated 312 by being dipped in lead sulphate aqueous solution for 5 minutes. The electrode is then rubbed over with a diamond sprayed polishing pad for another 5 minutes and then rinsed thoroughly with a flush of distilled water to generate a well cleaned electrode surface for subsequent modification with PbO and subsequent testing. This regeneration of the electrode ensures that the gold electrode is not wasted and can be reused.

Experimentation

Voltammetric measurements were performed on a Metrohm Autolab Galvanostat/Potentiostat (Utrecht, The Netherlands). Unlike conventional electrochemical cell, voltammetric experiments were done in a droplet of the supporting electrolyte solution which was aqueous solution of sodium chloride. The droplet was placed over the surface of the modified electrode with oxytocin already adsorbed over it by drying a droplet of oxytocin solution.

Overall, three droplets are used in embodiments of the voltammetric sensor. The first droplet is of PbO nanoparticles solution. Its drying leads to coverage of the gold electrode surface with PbO nanoparticles. The second droplet is of oxytocin solution, which is dried over the PbO modified gold electrode surface. During drying the solvent evaporates leaving the solute (oxytocin) spread over the surface of PbO modified gold electrode. The third droplet is of supporting electrolyte solution which is aqueous solution of sodium chloride. The third droplet is not dried because of the requirement of liquid medium for sensor operation and voltammetric measurement. The first two droplets which are of PbO solution and oxytocin solution are smaller (5 micro liter volume each), while the third droplet is comparatively bigger in size (10 micro liter). The reason of the small sized first two droplets is to quickly dry them and the reason for the comparatively larger sized third droplet is to maintain this droplet for a bit longer time so that before its evaporation voltammetric experiments could be recorded in it for quantifying oxytocin.

The three electrodes consisting of working electrode, i.e., oxytocin probe (gold transducer/PbO/adsorbed layer of oxytocin), counter electrode (platinum wire) and reference electrode (Ag/AgCl) are brought in contact with the droplet of the supporting electrolyte solution.

As such, a droplet cell is formed in which all the three electrodes surfaces are dipped into the droplet of supporting electrolyte solution, while other ends of the electrodes are connected to the Metrohm Autolab (Galvanostat/Potentiostat) which is integrated with a computer. The designed droplet based voltammetric sensor is clipped with a wooden stand to avoid contact of the electrodes with any conductor. The suspended sensor clipped through a wooden hook of the stand allows voltammetric measurement without any contact issue with a conducting surface.

In a conventional cell in which electrodes are suspended in a supporting electrolyte solution, the electrode modifier usually leaches away from the sensor surface due to gravity and dissolution in solvent medium. In the droplet cell of embodiments of the present disclosure, the gravity effect leading to leaching of the electrode modifier is avoided because droplet is placed over the sensor surface. Moreover, in conventional cell, an inert gas such as nitrogen or argon gas is bubbled for 5 to 10 minutes to exclude the possibility of dissolved oxygen which gives its own voltammetric signal that may disturb the signal of the analyte. While in the droplet cell of embodiments of the present disclosure, flushing of oxygen through bubbling with inert gas is not needed.

It is also important to avoid any oxygen presence at the modified electrode surface before putting the droplet of either oxytocin or droplet of supporting electrolyte solution. For this purpose, the nozzle of the tube (that allows inert gas from the cylinder) should be brought closer to the electrode surface for spraying a jet of inert gas over it for just a minute time and then the droplet be placed immediately over the deaerated/deoxygenated surface of the electrode.

Moreover, sensor operation in air does not affect results as assaying through the sensor is faster than the speed with which the oxygen gas from the air could diffuse into the droplet surface and then pass through it to reach the electrode surface. The sensor of embodiments of the present disclosure is able to determine the presence of oxytocin even in the presence of oxygen because oxygen gives its own signal in the negative potential domain while oxytocin signals in positive potential domain.

Conventional cells demand a Teflon cap with openings for the insertion of electrodes, and for gas outlet and gas inlet to take oxygen out through the incoming inert gas. No such arrangements are required in droplet cell. Conventional cells possess a greater volume capacity, usually 20 mL, thus demanding greater amount of the analyte while the droplet cell demands just a droplet of a few micro liters. In conventional cells, due to larger distance between the working and reference electrodes, IR drop effect occurs in the applied voltage that disturbs the signal of the analyte. While in droplet cell the electrodes are much closer, so IR drop effect is nullified.

In conventional cells, the analyte in bulk solution takes more time to preconcentrate over the electrode surface, hence, sensors using conventional cells are much slower to respond to the target analyte. The voltammetric sensor of embodiments of the present disclosure is significantly quicker to respond to target analyte as its construction involves a preconcentrated target sample via drying its droplet at the modified electrode surface. Preconcentrating the sample over the electrode surface via adsorption prevents time wastage due to diffusion from the bulk solution. Drying droplet of the analyte is also effective in achieving proper orientation of the analyte molecules that leads to intense and robust signal of the analyte when the sensor is subjected to voltammetric assay in the droplet of the supporting electrolyte solution.

The droplet is dried by a drier (such as hair drier, for example) from a distance of at least 20 cm. A distance smaller than 20 cm may cause the droplet to be thrown away from the electrode surface. Moreover, due to rapid drying from a closer distance of the drier, molecules of oxytocin in the droplet do not get enough time to adsorb with proper orientation. Drying from a distance of at least 20 cm dries oxytocin droplet with suitable orientation of its molecules at the electrode surface as required for robust intense signal during experimental assay.

For the next reading with the already used electrode, the surface must be cleaned. Simple cleaning as commonly done for electrode polishing in conventional sensors does not work for oxytocin sensor because its oxidized product strongly adsorbs over the electrode surface and the adsorbed product then disturbs the signal of oxytocin in further experiments done with the already used sensor. Therefore, regeneration of the electrode surface for the next assay is necessary in order to remove the oxidized product of oxytocin, as well as to improve the reusability (and improve the ecological impact) of the sensor.

To achieve very high reusability of the electrode, the used electrode is dipped in lead sulfate ($PbSO_4$) aqueous solution for 5 minutes, followed by rubbing the electrode over with a diamond sprayed polishing pad for another 5 minutes, and then thoroughly rinsed with a flush of doubly distilled water to generate a well cleaned electrode surface for modifying again with PbO and to use it for further assaying of oxytocin sensing.

Square wave voltammetric analysis (SWV) is used to detect oxytocin according to an embodiment of the present disclosure.

Supporting electrolytes strongly affect the peak current, shape, and position. The analytical signal of the oxytocin can be conducted with PbO modified gold electrode in several supporting electrolytes such as Acetate buffer (AB), Britton Robinson Buffer (BRB), potassium chloride (KCl), sodium chloride (NaCl), hydrochloric acid (HCl), sulphuric acid ($H_2SO_4$), and ethanoic acid ($CH_3COOH$), for example. A well-defined peak with maximum peak current response can be obtained with NaCl as a supporting electrolyte. Of the electrolytes tested, the second highest peak appears in KCl as a supporting electrolyte, with $H_2SO_4$ having the third highest peak.

The voltammetric response of oxytocin in various concentrations of sodium chloride can be obtained according to an embodiment of the present disclosure. The range of NaCl concentrations between 0.1 M and 0.6 M demonstrate that a concentration of NaCl within this range is able to produce a clear peak for the detection of oxytocin. The highest and most well-defined peak of oxytocin appears in a 0.3 mol/litre (M) solution of sodium chloride. The second and third highest peaks of oxytocin appear in 0.2 M and 0.4 M sodium chloride solutions respectively.

A well-defined signal of the oxytocin can be obtained in only 5 seconds. With further deposition time, the signal intensifies. At 20 seconds of deposition time, the peak current of oxytocin reaches its maximum intensity. Therefore, embodiments of the present disclosure use a deposition time of around 20 seconds as a suitable deposition time for the rest of the analytical detection experiments. Around 20 seconds may refer to a range between 15 and 25 seconds.

In embodiments of the present disclosure, a deposition time of less than 25 seconds is used.

In embodiments of the present disclosure, a deposition time of between 5 and 25 seconds is used.

Figure 4:
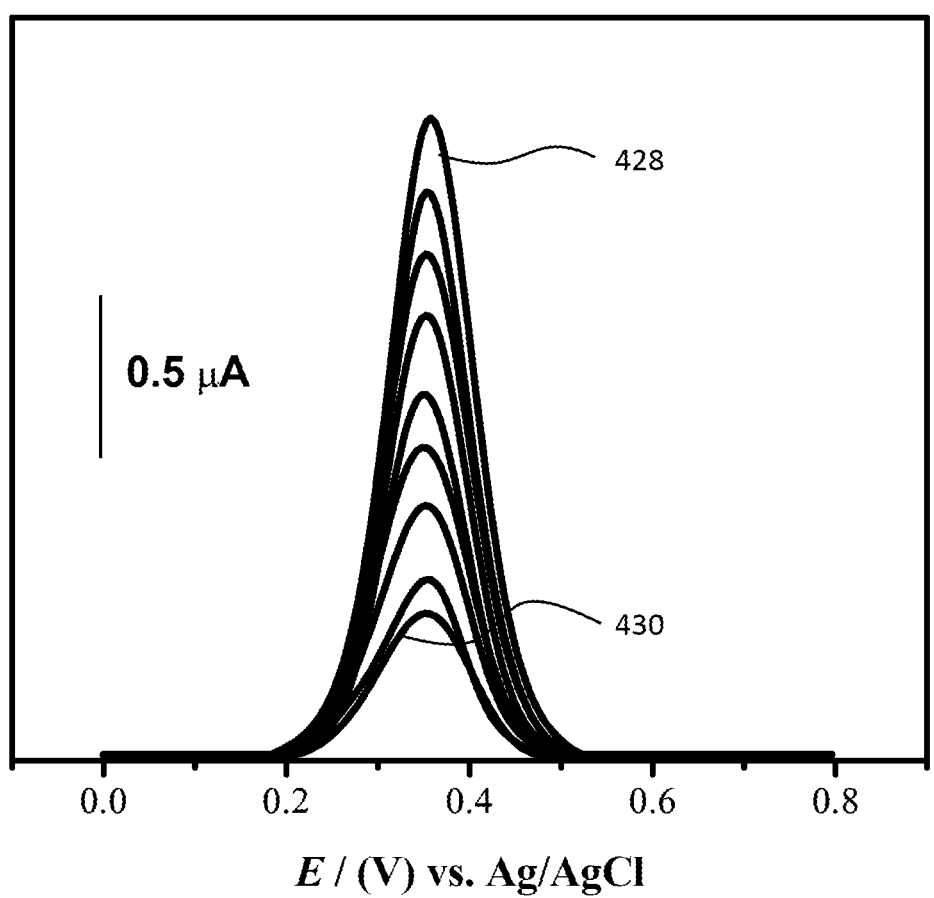
FIG. 4 shows voltammograms of different concentrations of oxytocin according to an embodiment of the present disclosure.

FIG. 4 shows a voltammogram of different concentrations of oxytocin according to an embodiment of the present disclosure.

Several voltammograms were recorded by employing square wave voltammetric technique to evaluate the detection and quantification limits of the analyte oxytocin at the gold electrode transducer modified with PbO nanoparticles, under optimized conditions such as 0.3 M NaCl, −0.8 V deposition potential, and 20 second deposition time. The tallest peak 428 represents a concentration of oxytocin of 1 micro moles per litre. The shortest peak 430 represents a concentration of 0.2 micro moles per litre. The chart demonstrates that the peak current decreases linearly with a decrease in the analyte concentration, and that the method of the present disclosure is able to detect and generate a response for very small quantities and concentrations of analyte.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. A voltammetric sensor for the detection of oxytocin, the voltammetric sensor comprising:
    a gold electrode comprising lead oxide (PbO) nanoparticles; and
    a counter electrode.

2. The voltammetric sensor as claimed in claim 1, wherein a sensing area of the gold electrode has an area of less than 10 square millimetres ($mm^2$).

3. The voltammetric sensor as claimed in claim 1, wherein the sensor further comprises a reference electrode.

4. The voltammetric sensor as claimed in claim 3, wherein the reference electrode comprises silver (Ag).

5. The voltammetric sensor as claimed in claim 3, wherein the sensor further comprises a potentiostat that is electrically connected to the gold electrode, the reference electrode, and the counter electrode.

6. The voltammetric sensor as claimed in claim 1, wherein the counter electrode comprises platinum (Pt).

7. The voltammetric sensor as claimed in claim 6, wherein the sensor further comprises a reference electrode comprising silver (Ag) and silver chloride (AgCl).

8. A method of detecting oxytocin using a voltammetric sensor, the voltammetric sensor comprising a gold electrode, the gold electrode comprising lead oxide (PbO) nanoparticles, the method of detecting oxytocin comprising the steps of:
    positioning a liquid droplet, comprising solvent and analyte, to be tested on a sensing area of the gold electrode;
    receiving a voltammetric response from the electrode; and
    analysing the voltammetric response to determine if oxytocin is present in the liquid droplet.

9. The method as claimed in claim 8, wherein the method comprises the step of:
    evaporating the solvent of the liquid droplet such that the analyte remains on the sensing area of the electrode as a dry residue.

10. The method as claimed in claim 9, wherein the method comprises the step of:
    applying a droplet of an electrolyte solution onto the dry residue, wherein the electrolyte solution comprises a solvent and an electrolyte.

11. The method as claimed in claim 10, wherein the solvent of the electrolyte solution is water.

12. The method as claimed in claim 10, wherein the electrolyte of the electrolyte solution is sodium chloride (NaCl).

13. The method as claimed in claim 10, wherein the droplet of the electrolyte solution is less than 20 microlitres in volume.

14. The method as claimed in claim 8, wherein the sensing area of the gold electrode has an area of less than 10 square millimetres ($mm^2$).

15. The method as claimed in claim 8, wherein the liquid droplet is less than 10 microlitres in volume.

16. The method as claimed in claim 8, wherein the method further comprises the step of:

treating the gold electrode with a lead sulphate ($PbSO_4$) solution to regenerate the gold electrode after analysing the voltammetric response to determine if oxytocin is present in the liquid droplet.

\* \* \* \* \*